United States Patent
Gombert et al.

(10) Patent No.: US 9,606,644 B2
(45) Date of Patent: Mar. 28, 2017

(54) MANUALLY OPERABLE INPUT DEVICE WITH CODE DETECTION

(71) Applicant: gomtec GmbH, Seefeld (DE)

(72) Inventors: Bernd Gombert, Worthsee (DE); Friedemann Seebass, Alling (DE)

(73) Assignee: GOMTECH GMBH, Seefeld (DE)

(*) Notice: Subject to any disclaimer, the term of this patent is extended or adjusted under 35 U.S.C. 154(b) by 24 days.

(21) Appl. No.: 14/768,437

(22) PCT Filed: Feb. 17, 2014

(86) PCT No.: PCT/EP2014/053003
§ 371 (c)(1),
(2) Date: Aug. 17, 2015

(87) PCT Pub. No.: WO2014/128076
PCT Pub. Date: Aug. 28, 2014

(65) Prior Publication Data
US 2016/0004336 A1 Jan. 7, 2016

(30) Foreign Application Priority Data
Feb. 19, 2013 (DE) .................. 10 2013 002 830

(51) Int. Cl.
*G06F 3/0362* (2013.01)
*G06F 3/0484* (2013.01)
(Continued)

(52) U.S. Cl.
CPC .............. *G06F 3/0362* (2013.01); *G05G 1/08* (2013.01); *G06F 3/04847* (2013.01); *G07C 9/00666* (2013.01)

(58) Field of Classification Search
CPC ........ G06F 3/02; G06F 3/0227; G06F 3/0362; G06F 3/04847; G06F 3/0484
See application file for complete search history.

(56) References Cited

U.S. PATENT DOCUMENTS 5,678,539 A * 10/1997 Schubert ........... A61M 16/0051
128/204.21
7,143,355 B2 * 11/2006 Yamaguchi ........... G06F 1/1616
709/203
(Continued)

FOREIGN PATENT DOCUMENTS

DE 102008019144 A1 10/2009
EP 1655953 A1 5/2006
(Continued)

OTHER PUBLICATIONS

Wikipedia: Jog Shuttle, Germany, 1 page, Dec. 9, 2012, https://de.wikipedia.org/wiki/Jog/Shuttle (translated).

*Primary Examiner* — Patrick F Marinelli
(74) *Attorney, Agent, or Firm* — Schwabe Williamson & Wyatt

(57) ABSTRACT

The invention relates to a manually operable input device (1) having a sensor system (15) that comprises at least one rotary control knob (4) for detecting at least one movement characteristic variable. By predefining various movement patterns at the rotary control knob (4), various control commands can be generated. For this purpose, the input device (1) according to the invention comprises an evaluation unit (8) that compares the signal (13, 14) generated by the sensor system (15) with predefined rotational movement codes (C1-C16) and generates a code-dependent control command (16) if the predefined movement pattern or the corresponding signal (13, 14) matches a predefined rotational movement code (C1-C16).

10 Claims, 3 Drawing Sheets

(51) Int. Cl.
  *G05G 1/08* (2006.01)
  *G07C 9/00* (2006.01)

(56) References Cited

U.S. PATENT DOCUMENTS

| | | | | |
|---|---|---|---|---|
| 8,519,987 | B2* | 8/2013 | Bonne | B60K 37/06 200/14 |
| 8,912,457 | B2* | 12/2014 | Tseng | G06F 3/0488 200/329 |
| 2002/0149621 | A1* | 10/2002 | Yamaguchi | G06F 1/1616 715/764 |
| 2003/0153992 | A1* | 8/2003 | Maruyama | G06F 1/1632 700/83 |
| 2005/0280500 | A1 | 12/2005 | Miller et al. | |
| 2006/0082545 | A1* | 4/2006 | Choquet | G05G 1/105 345/156 |
| 2007/0273649 | A1 | 11/2007 | Matsui | |
| 2008/0055241 | A1 | 3/2008 | Goldenberg | |
| 2011/0025652 | A1* | 2/2011 | Bonne | B60K 37/06 345/184 |
| 2011/0063212 | A1 | 3/2011 | Ries | |
| 2013/0249814 | A1* | 9/2013 | Zeng | G06F 3/0488 345/173 |
| 2014/0042004 | A1* | 2/2014 | Tseng | G06F 3/0488 200/336 |
| 2014/0108987 | A1* | 4/2014 | Iwamura | G06F 3/03 715/771 |
| 2014/0258935 | A1* | 9/2014 | Nishida | G06F 3/038 715/833 |
| 2015/0029115 | A1* | 1/2015 | Hlatky | G06F 3/041 345/173 |
| 2015/0029145 | A1* | 1/2015 | Hlatky | G06F 3/041 345/174 |
| 2015/0135132 | A1* | 5/2015 | Josephson | G06F 3/0482 715/784 |
| 2015/0253750 | A1* | 9/2015 | Eronen | G05B 15/02 700/12 |
| 2015/0381230 | A1* | 12/2015 | Suppelsa | H04B 1/48 455/77 |
| 2016/0004336 | A1* | 1/2016 | Gombert | G07C 9/00666 345/184 |

FOREIGN PATENT DOCUMENTS

| | | |
|---|---|---|
| JP | 2001-84099 A | 3/2001 |
| JP | 2001-209615 | 8/2001 |
| JP | 2002-157074 A | 5/2002 |
| JP | 2005-31913 A | 2/2005 |
| JP | 2005-293408 | 10/2005 |
| JP | 2006-243783 A | 9/2006 |
| JP | 2007-102664 A | 4/2007 |
| JP | 2009-112436 A | 5/2009 |
| KR | 10-2012-0005142 | 1/2012 |

* cited by examiner

MANUALLY OPERABLE INPUT DEVICE WITH CODE DETECTION

The present application is a U.S. National Phase of PCT/EP2014/053003, filed Feb. 17, 2014 entitled "MANUALLY OPERABLE INPUT DEVICE WITH CODE DETECTION," which claims priority to German patent application No. 10 2013 002 830.2 filed on Feb. 19, 2013, which are incorporated herein by reference in their entirety.

Manually operable input devices which are referred to below are in particular used to control software applications such as, for example, CAD programs, mobile devices or machines, such as robots, to control tools or to control other devices which can be controlled electrically. Typical input devices are, for example, mice, joysticks, keyboards, trackballs or 3D input devices to control virtual or real objects in space.

For example, a 3D input device is known from DE 10 2008 019 144, which comprises a 3D control element as well as an additional rotary control knob. Control demands in and about three spatial axes can be input via the 3D control element (i.e. in 6 degrees of freedom). The rotary control knob here is a rotatable wheel with which the user can execute additional functions. Therefore, by rotating the rotary control knob, for example, the sensitivity of the 3D control can be changed, the brightness of a screen can be adjusted, or a zoom region can be defined on the screen, in which depicted elements are made smaller or larger depending on the direction of rotation. The respective function of the rotary control knob can be configured by the user. In a certain configuration, this, however, always executes the same function. In order to change the functionality of the rotary control knob, the rotary control knob must be reconfigured. If the user would like, for example, to firstly adjust the brightness of the display and then the sensitivity of the 3D input device with the rotary control knob, then he must reconfigure the rotary control knob, i.e. allocate a different function to the rotary control knob via the software. This is relatively laborious and disrupts the smooth workflow.

An input device to actuate a closing mechanism of a safe is known from US 2005/0280500 A1. The closing mechanism therein comprises a rotary control knob, via which, for example, a certain number combination can be input which opens the safe. In order to input a number combination, the user must rotate the rotary control knob alternately in the clockwise direction or in the counterclockwise direction and introduce a short pause between the change in direction. If the pause is neither too long nor too short, the set number is considered as a correctly input value. Otherwise the input is rejected as being invalid.

The Wikipedia article: Jog/Shuttle, http://de.wikipedia.org/wiki/Jog/Shuttle, dated Sep. 12, 2012, discloses an operating element of a video recorder/laser disk player/DVD player, which comprises a rotary control knob (jog dial or shuttle ring). By rotating the jog dial or the shuttle ring, a user can, for example, wind forward or rewind an image sequence. The number of displayed frames is therein proportional to the rotational angle of the jog dial; the winding speed is proportional to the rotational angle of the shuttle ring. However, only one single function can ever be executed by actuating the operating element.

It is therefore an object of the present invention to create a manually operable input device having at least one rotary control knob, in which different functions can be executed by the rotational movement of the rotary control knob without having to reconfigure the rotary control knob for this purpose each time.

This object is solved according to the invention by the features specified in the independent claims. Further exemplary embodiments of the invention result from the sub-claims.

According to the invention, a manually operable input device is proposed to control software applications or machines which comprise at least one rotary control knob, an evaluation unit and a detection device which comprises a sensor system to detect at least one movement characteristic variable, wherein the evaluation unit compares a movement pattern which is provided on the rotary control knob with different predefined rotational movement codes which each comprise at least two code values (a, b, c, $t_1$, $t_2$, $t_3$) which each define a rotational direction, a movement duration, a pause or a rotational angle. In the case of matching the movement pattern with one of the predefined rotational movement codes, a code-dependent control command is generated.

Therefore, various movement patterns can be input on the rotary control knob, such as, for example, "right-hand rotation, left-hand rotation, right-hand rotation", which are changed into corresponding sensor signals by the sensor system. The movement pattern or the sensor signal generated from this is then compared to the stored rotational movement code and, in the case of matching one of the rotational movement codes, a control command allocated to the relevant code is generated. By inputting a first movement pattern, a first function, such as, for example, zooming in on an object, can therefore be executed, and by inputting a second movement pattern, a different second function, such as, for example, the adjustment of the brightness of the screen, is executed. A reconfiguration of the input device is no longer required.

According to a simple embodiment of the input device according to the invention, the sensor system of the rotary control knob is designed in such a way that this can only detect the rotational direction of the rotary control knob and, possibly, the time. In this case, only movement patterns made from right- and left-hand rotational movements and, if necessary, the temporal delay between two rotational movements can be recognized. The allocated rotational movement codes preferably contain only rotational movement or, possibly, time values, such as, for example "right, left, right" or "right, time value, left, time value, right".

According to a preferred embodiment of the input device according to the invention, the sensor system of the rotary control knob is designed in such a way that different movement characteristic variables can be detected. The rotary control knob is preferably capable of detecting one or more of the following movement characteristic variables: a movement direction, a movement duration, a rotational angle, a rotational speed or a rotational acceleration of the rotatable element of the rotary control knob. The user can therefore also generate a control command and execute a certain action via the duration of the rotational movement, the rotational angle, the rotational speed and/or the rotational acceleration.

For the sensor system of the rotary control knob, any known sensors, such as, for example, optical sensors, can fundamentally be used, which, for example, generate electrical pulses from which a movement characteristic variable, such as, for example, a rotational angle, a rotational speed or another movement characteristic variable can then be determined. The evaluation of the pulse signals usually occurs by the use of software.

A rotational movement code comprises, according to the invention, at least two code values, such as, for example, a rotational direction value (e.g. "right") and/or a rotational angle value (e.g. "−90°", i.e. a left-hand rotation by 90°). A code value in the simplest case is a value of a movement characteristic variable or a time value. In order to generate a desired control command, the user must input the code values one after the other on the rotary control knob. A rotational movement code preferably comprises at least two code values, but can in principle also contain three, four or more different code values.

A code value can also comprise a link of several movement characteristic variables and/or time variables, such as, for example, "left-hand rotation by 90°" (AND-link of rotational direction and rotational angle).

A code value can additionally comprise one or more conditions, such as, for example, "greater than", "smaller than", or "the same as". With the aid of conditions, for example, it can be provided that the rotational angle of a movement may amount to "at least 90°" or the rotational speed may amount to "a maximum of 360°/s" so that matching between the rotational movement provided by the user and a rotational movement code is recognized. It is clear to the person skilled in the art that he can fundamentally provide any rotational movement code by specification of certain conditions which then trigger a corresponding command in the case of matching a movement pattern.

According to a preferred embodiment, the sensor system of the input device also comprises a timer, in particular to determine the temporal delay between at least two actions executed on the rotary control knob one after the other and/or to determine a movement duration. The timer can optionally count forwards or backwards (countdown).

The timer is preferably reactivated each time if a control demand has been recognized as matching a code value, a movement of the rotary control knob, or a change in the rotational direction has been determined.

According to the invention, it can be provided that the user must execute a certain command which corresponds to a code value in order to display to the input device the end of a control demand executed on the rotary control knob. In this way, the input device can differentiate shorter movement patterns from longer movement patterns. In order to display to the input device that a control demand has ended, the user can, for example, introduce a pause which is greater than a predefined threshold value. The user could, however, also actively confirm the completion of a control demand by, for example, executing a predefined action such as, for example, an actuation of a button. In this case, the input device according to the invention preferably comprises a device to recognize the end of a control demand executed on the rotary control knob, such as, for example, a timer or a button. It is clear to the person skilled in the art that any other known devices can also be provided for this purpose.

The evaluation unit of the control device according to the invention preferably only emits a control command after the end of a control demand has been recognized.

According to a preferred embodiment of the invention, the input device is realized as a 3D input device having an additional rotary wheel as a rotary control knob.

The invention also relates to a method to control software applications or machines by a manually operable input device, as has been described above. According to the invention, the method comprises the detection of an actuation of a rotary control knob, the comparison of the actuation pattern on the rotary control knob with various, predefined movement codes which each comprise at least two code values (a, b, c, $t_1$, $t_2$, $t_3$) which each define a rotational direction, a movement duration, a pause or a rotational angle, and the generation of a control command, if a match between the actuating pattern and one of the predefined movement codes has been recognized.

BRIEF DESCRIPTION OF THE DRAWINGS

The invention is explained below in more detail by way of example by the included drawings. Here are shown.

EMBODIMENTS OF THE INVENTION

Figure 1:
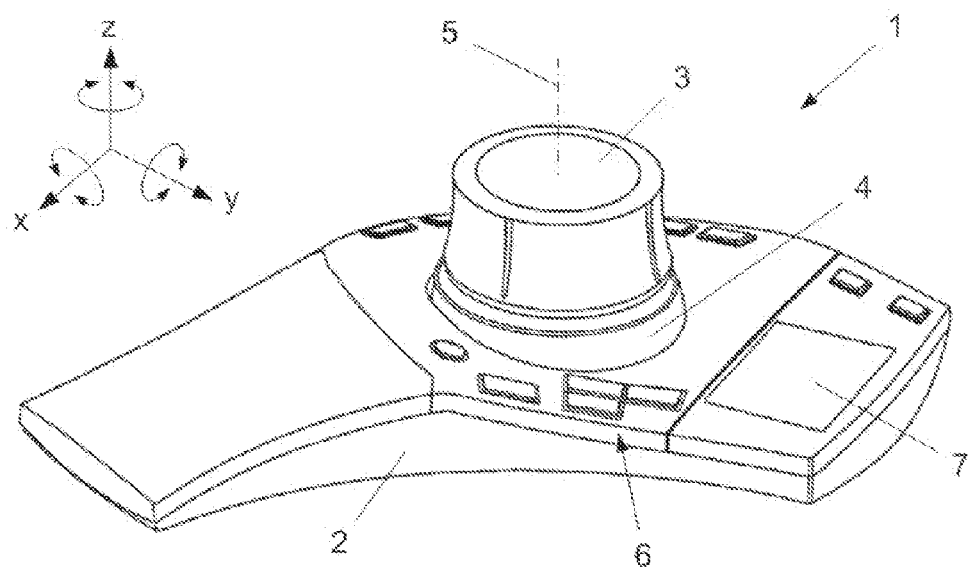
FIG. 1 a perspective view of a 3D input device having an additional rotary wheel.

FIG. 1 shows an exemplary embodiment of an input device to control software applications such as, for example, CAD software. The depicted input device 1 can also be used, however, to control machines, such as, for example, robots, vehicles or any other applications. The input device 1 is capable of changing translational and rotary control demands in or about all three Cartesian spatial axes into corresponding electrical control signals, and can therefore also be referred to as a 3D input device.

The 3D input device 1 depicted in FIG. 1 comprises a base body 2, to which an operating element 3 which is realized here in the form of a cap, is moveably connected. The operating element 3 can be moved in the x, y and x direction as well as being able to be pivoted about the axes referred to. The operating element 3 forms a part of a 3D sensor, the actual sensor element of which is arranged in the interior of the base body 2 and can be, for example, the 3D measurement system descried in German patent DE 10 2006 058 805.

Furthermore, a rotary control knob 4 in the form of a wheel is provided in the region of the operating element 3, on which further control demands can be input. The rotary control knob 4 is rotatable around the same rotational axis 5 as the 3D control element 3. Additionally, further operational elements such as, for example, buttons 6 and/or a display 7 are arranged on the base body 2.

The 3D input device 1 depicted in FIG. 1 is designed such that it can detect certain rotational movement patterns which are provided on the rotary control knob 4, and can generate a corresponding control command depending on the respective rotational movement pattern.

The actual sensor element of the rotary control knob 4 can, for example, be an optical, magnetic, piezoelectric or any other known sensor element. The rotary control knob 4 generates, for example, a range of impulses during actuation of the rotary wheel, from which various movement characteristic variables, such as, for example, a rotational angle, can be determined. The further processing of the impulse signal can take place in the base body 2 or outside the base body 2, for example in an external computer. In the latter case, the external component is also included in the rotary control knob 4.

According to a simple embodiment, the rotary control knob 4 is realized in such a way that it can only detect the rotational direction of a rotational movement as well as the time interval between two rotational movements. According to a preferred embodiment of the input device according to the invention, the rotary control knob 4 is designed in such a way that it can detect various movement characteristic variables. The rotary control knob 4 is preferably capable of detecting one or more of the following movement characteristic variables: a movement direction, a movement duration, a rotational angle, a movement pause, a rotational speed and/or a rotational acceleration of the rotatable element of the rotary control knob 4. The user can therefore also generate a control command via the duration of the rotational movement, the rotational angle, the rotational speed and/or the rotational acceleration and execute a certain action. Additionally, the duration of a pause between two rotational movements can also be used as a control parameter.

Figure 2:
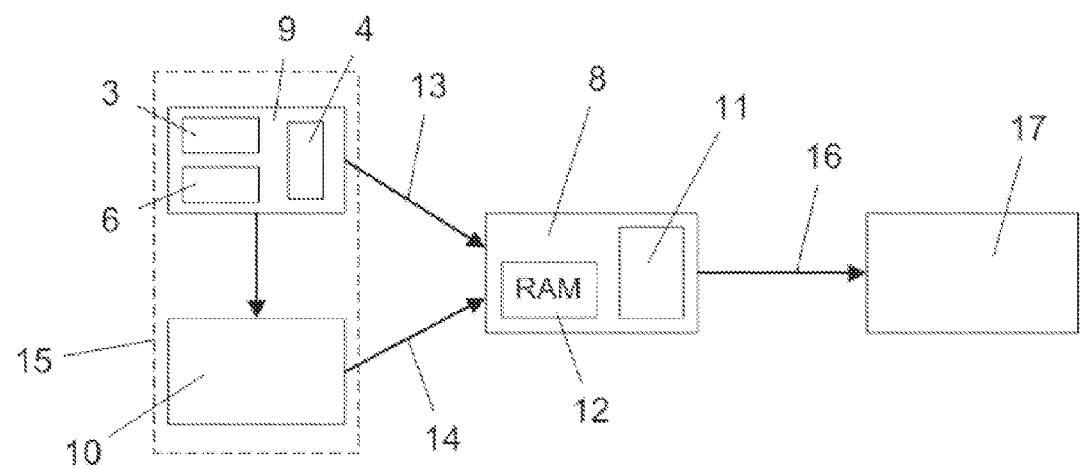
FIG. 2 a schematic block depiction of an input device according to one embodiment of the invention.

The basic construction of an input device according to the invention is depicted schematically in FIG. 2. Therein, the reference numeral 15 refers to a device to detect all actuations on the input device 1 as well as the time. The detection device 15 can comprise a timer 10, at least one sensor system 9 which can detect the inputs of the 3D operating element 3, the rotary control knob 4 and/or several buttons 6. The timer 10 is preferably realized to stop the time and/or recognize when time limits are exceeded. For example, a maximum time limit $t_{max}$ can be defined, in the case of exceeding which the detection device 15 generates an output signal 14. For inputs which the sensor system 9 has recognized, the detection device 15 can generate output signals 13.

The output signals 13, 14 are transferred from the detection device 15 via a data connection to an evaluation unit 8. The evaluation unit 8 compares the output signal 13, 14 generated by the detection device 15 or a signal derived therefrom with predefined rotational movement codes C1-C16 (see, for example, FIG. 3 or 4), which can be stored in a memory 12. If a matching of one of the rotational movement codes C1-C16 with a movement pattern provided on the rotary control knob 4 has been determined, a command generator 11 generates a corresponding command 16 which is allocated to the respective code C1-C16. This can, for example, be a control command to make a screen view larger or smaller, to adjust the brightness, to rotate or displace a graphical object, to control a software application or any other command.

The evaluation unit 8 or a part thereof as well as parts of the detection device 15 can optionally be realized in hardware or in software. Therefore, for example, an evaluation algorithm and the command generator 11 or the timer 10 can be implemented in software. The components 15 and 8 depicted in FIG. 2 can, for example, be integrated into the base body 2 or the input device 1. Parts of the electronics or software can also be distributed, however, in other devices, for example in a computer, to which the base body 2 has been connected. In this case, the input device 1 according to the invention could also comprise components of the computer.

Figure 3:
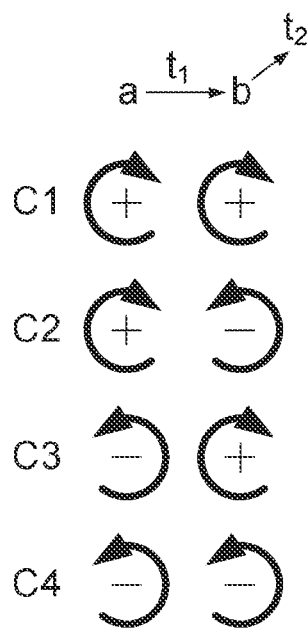
FIG. 3 various rotational movement codes, each having two code values for movement characteristic variables.

FIG. 3 shows different rotational movement codes C1-C4 which each comprise two code values. In the depicted exemplary embodiment, the individual rotational movement codes C1-C4 contain only rotational direction values a, b, wherein a right-hand rotation is marked with a corresponding arrow and a "+" symbol and a left-hand rotation is marked with a corresponding arrow and a "−" symbol. A respective pause $t_1$ is defined between two code values a, b.

The movement pattern input on the rotary control knob 4 or the signals 13, 14 generated therefrom are processed by the evaluation unit 8 and compared to the predefined, rotational movement codes C1-C4 which are preferably filed in the memory 12. If the user rotates the rotary control knob 4, for example to the right, then introduces a pause which is greater than the time $t_1$, and then rotates the rotary control knob 4 to the right again, a matching with the movement code C1 is determined and a corresponding command 16 is emitted at the output of the control device which is transferred to the object 17 to be controlled. For a movement pattern "left-hand rotation, pause, right-hand rotation", the rotational movement code C3 is recognized and another control command is generated accordingly.

In order to display the end of a control demand or a movement pattern to the input device 1, the user can, for example, actuate a button 6 provided for this or execute another predefined action. In the present case it is provided that the user waits after the input of a second code value for at least a time duration $t_2$ which exceeds the time limit $t_{max}$ in order to display the end of his input. The time duration $t_{max}$ is therein preferably greater than $t_1$. The time $t_1$ can, for example, amount to 0.5 s and $t_{max}$ to 1 s.

The code values a, b of the rotational movement codes C1-C4 can also comprise a condition such as, for example, "greater than", "smaller than" or "the same as", which must be fulfilled by the control demand. In the exemplary embodiment of FIG. 3, for example, it can be defined that the duration of a rotational movement must be greater than, for example, 0.2 s.

The timer 10 can, for example, then always be started if a rotational movement has been stopped or started on the rotary control knob 4 or a direction change of the rotational movement has been recognized.

Figure 4:
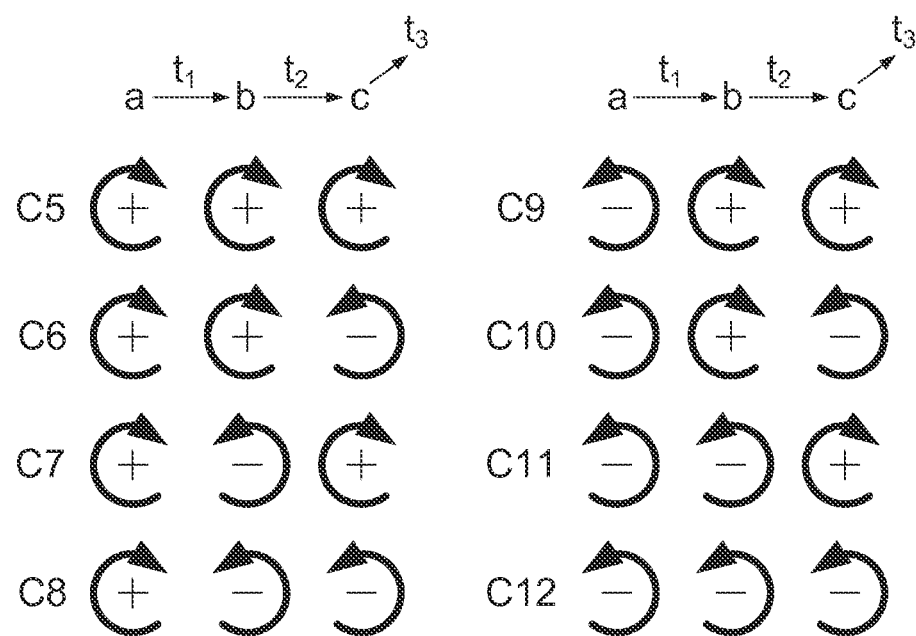
FIG. 4 various rotational movement codes, each having three code values for movement characteristic variables.

FIG. 4 shows various rotational movement codes C5-C12 which each comprise three code values of rotational movement characteristic variables and two time values $t_1$, $t_2$. The end of a control demand can here be recognized again by time monitoring if the time limit $t_{max}$ has been exceeded by a time duration $t_3$ following the third code value, wherein $t_{max} > t_1$, $t_2$ applies for $t_{max}$.

The individual rotational movement codes a, b, c in turn comprise only rotational direction values, in particular "right" or "left". When inputting a right-hand rotation, followed by a first pause greater than $t_1$ (shorter than $t_{max}$), a subsequent second right-hand rotation, followed by a second pause greater than $t_2$ (shorter than $t_{max}$) and a subsequent left-hand rotation, followed by a longer pause $t_3$ (greater than $t_{max}$), for example the movement code C6 is recognized and a corresponding control command 16 is generated at the output. For a control demand "left-hand rotation, left-hand rotation, right-hand rotation" (each with a pause), the rotational movement code C11, for example, is recognized.

By determining the time limit $t_{max}$, it is furthermore possible to differentiate similar rotational movement codes with a different number of code values, such as, for example, code C3 and code C9 or C10: for these codes, the code values a and b as well as the time value $t_1$ match. However, due to the following time $t_2$ which begins after the input of the second code value b, a rotational movement code having two code values can be differentiated from a rotational movement code having three code values as follows: if the time $t_2$ after the code value b exceeds the time limit $t_{max}$, the code detection is stopped and therefore code C3 is automatically recognized. If, however, a further code value c follows after the code value b before exceeding the time limit $t_{max}$, so $t_2 < t_{max}$, then a rotational movement code having three valid code values a, b and c is recognized. If, for example, for code value c, a right-hand rotation occurs, code C9 can be recognized.

Figure 5:
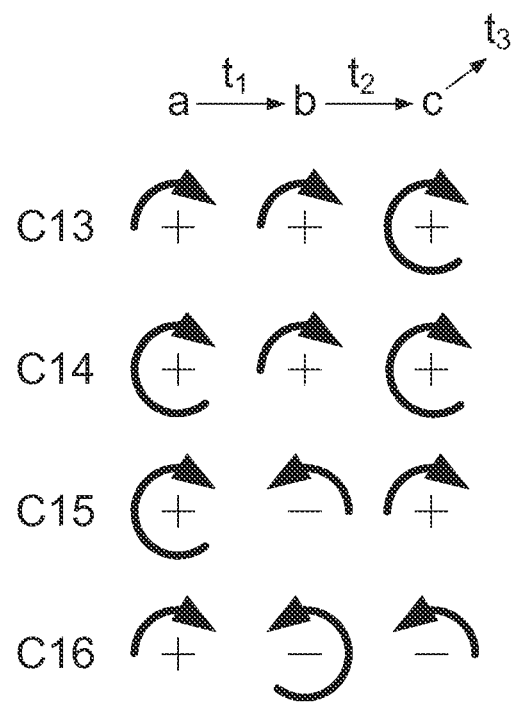
FIG. 5 various rotational movement codes having combined code values of various movement characteristic variables according to a second embodiment of the invention.

FIG. 5 shows various rotational movement codes each having three code values a, b, c, wherein the individual code values a, b, c also contain information concerning the rotational angle besides information concerning the rotational direction. A rotational angle of, for example 90° is therein depicted by a shorter arrow, and a rotational angle of, for example, 180° by a longer arrow. If the user would like, for example, to execute the command which is assigned to the rotational movement code C14, he must rotate the rotary control knob 4 by at least 180° to the right (but, for example, less than 270°), then introduce a pause of at least the time duration $t_1$ ($<t_{max}$), followed by rotating the rotary control knob by at least 90° to the right (for example less than 180°), then again introducing a pause which is greater than the time duration $t_2$ ($<t_{max}$), followed by rotating the rotary control knob 4 again at least by 180° to the right, as well as actuating the end of his input by a longer pause $t_3$. The same applies for the other codes C13, C15 or C16.

The arrows shown in FIG. 5 can alternatively also be understood as different rotational speeds, wherein a shorter arrow depicts a lower rotational speed and a longer arrow depicts a higher rotational speed. In this case, the user must, in order to implement the control command allocated to the rotational movement code C14, firstly rotate the rotary control knob 4 quickly to the right, then in turn introduce a pause of at least the length $t_1$ ($<t_{max}$) then rotate the rotary control knob 4 slowly to the right, then in turn introduce a pause of the length $t_2$ ($<t_{max}$) and finally in turn rotate the rotary control knob 4 quickly to the right. The same also applies for the remaining rotational movement codes C13, C15 or C16.

Figure 6:
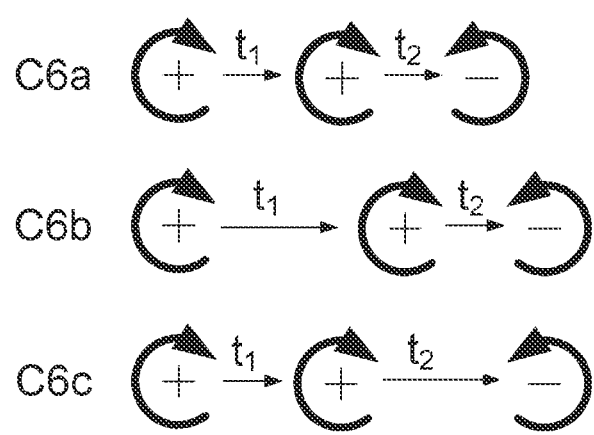
FIG. 6 various rotational movement codes having combined code values of various movement characteristic variables according to a third embodiment of the invention.

FIG. 6 shows various rotational movement codes C6a-C6c, for which the time duration between two consecutive code vales a, b, c is considered as an additional parameter. The user can therefore execute various control commands by variation of the time intervals between two actions.

In the case of the rotational movement code C6a, the user must, for example, firstly execute a right-hand rotation, followed by a first pause of the length $t_1$, then a further right-hand rotation, followed by a second pause of the length $t_2$, and then a left-hand rotation. Here, the two pauses are the same length and can, for example, amount to at least 0.5 s. If the user exceeds a time duration $t_{max}$ during the pauses $t_1$, $t_2$ or $t_3$, the movement detection is stopped. If the user, however, would like to execute the control command allocated to the rotational movement code C6b, he must firstly rotate the rotary control knob 4 to the right, introduce a longer pause $t_1$ ($<t_{max}$) then rotate the rotary control knob 4 to the right again and then introduce a shorter pause $t_2$ ($<t_{max}$) and finally rotate the rotary control knob 4 to the left. The time duration $t_1$ is therefore greater than in the first case; the times $t_2$, however, are the same length. By a variation of the time intervals $t_1$, $t_2$, the user can therefore execute different control commands. In other words, different commands can be defined by time intervals $t_1$, $t_2$ defined with different lengths, wherein exceeding the time limit $t_{max}$, as previously, leads to a stopping of the rotational movement detection.

The stop condition for ending a control demand on the rotary control knob can, for example, be a pause $t_{max}$ which is greater than 1 s. The individual pause times $t_2$ and $t_3$ must be coordinated to the respective application case and can possibly also be adjusted in a user-defined manner. As a consequence, the input device 1 according to the invention is suitable to determine and to differentiate different rotational movement codes by e of at least one code value of at least two consecutive rotational movements a, b, c and/or by e of at least one time interval ($t_1$, $t_2$, $t_3$, etc.) between at least two consecutive rotational movements a, b, c.

It should be noted that the codes shown in FIGS. 3 to 6 only depict a selection of possible rotational movement codes and are not limited to the depicted codes. For example, codes having four or more code values are also possible. The entirety of the codes and the assigned commands thereof can advantageously be established in the form of a database.

If a rotational movement code is not recognized by the evaluation unit 8 (e.g. if the user provides a rotational movement code on the rotary control knob 4 which is not filed in the memory module 12), then the input device 1 can emit an error message and potentially request the user to correct his input. The error message can, for example, be displayed on the display 7 of the input device 1.

The invention claimed is:

1. A manually operable input device to control software applications or machines, having a rotary control knob for inputting a movement pattern in the form of several consecutive rotational movements, wherein
   a sensor system is provided, which detects the movement direction as a first movement characteristic variable and the movement duration or the rotational speed as a second movement characteristic variable for a rotational movement executed on the rotary control knob,
   an evaluation unit which compares a movement pattern provided on the rotary control knob with various predefined rotational movement codes which each comprise at least two code values, wherein at least one of the code values is a link of a movement direction to a movement duration or a rotational speed; and
   the input device is configured in such a way that it generates an allocated control command when a movement pattern input by the user on the rotary control knob matches one of the predefined rotational movement codes.

2. The input device according to claim 1, wherein the detection device is furthermore designed to detect a pause between two rotational movements.

3. The input device according to claim 2, wherein the detection device comprises a timer.

4. The input device according to claim 1, wherein a rotational movement code comprises at least two code values of movement characteristic variables and one or more time values.

5. The input device according to claim 1, wherein it comprises a device to recognize the end of a control demand executed on the rotary control knob.

6. The input device according claim 1, wherein the evaluation unit recognizes the end of a user input by checking whether the time duration following a rotational movement exceeds a time limit.

7. The input device according to claim 1, wherein the input device is realized as a 3D input device having an additional rotary wheel as a rotary control knob.

8. A method to control software applications or machines by a manually operable input device, comprising a rotary control knob, a detection device and an evaluation unit, comprising the following steps:
- detection of a movement pattern inputted by a user on the rotary control knob by a sensor system which detects the movement direction as a first movement characteristic variable and the movement duration or the rotational speed as a second movement characteristic variable for each rotational movement executed on the rotary control knob;
- comparison of the movement pattern, with which the rotary control knob is moved, with various predefined movement codes which each comprise at least two code values, wherein a code value is a link of a movement direction to a movement duration or a rotational speed; and
- generation of a control command which is dependent on the respective rotational movement code when the movement pattern matches one of the rotational movement codes.

9. The method according to claim 8, comprising the step: detection of a pause between two rotational movements.

10. The method according to claim 8, comprising the step: detection that a time limit is exceeded.

\* \* \* \* \*

UNITED STATES PATENT AND TRADEMARK OFFICE
CERTIFICATE OF CORRECTION

PATENT NO. : 9,606,644 B2
APPLICATION NO. : 14/768437
DATED : March 28, 2017
INVENTOR(S) : Bernd Gombert et al.

Page 1 of 1

It is certified that error appears in the above-identified patent and that said Letters Patent is hereby corrected as shown below:

In the Claims

At Column 8, Line 61, delete "according claim" and replace it with --according to claim--.

Signed and Sealed this
Eleventh Day of December, 2018

Andrei Iancu
*Director of the United States Patent and Trademark Office*